United States Patent
Bergstrom et al.

(10) Patent No.: US 6,743,509 B2
(45) Date of Patent: Jun. 1, 2004

(54) METHOD OF TREATING PRECIPITATED CALCIUM CARBONATE FILLERS

(75) Inventors: Debora Frances Bergstrom, Midland, MI (US); Gary Thomas Burns, Midland, MI (US); Sarah Bridget Granzo, Midland, MI (US); Csilla Kollar, Midland, MI (US); Clifford Carlton Reese, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/263,439

(22) Filed: Oct. 1, 2002

(65) Prior Publication Data

US 2004/0063816 A1 Apr. 1, 2004

(51) Int. Cl.[7] .............................. C08K 3/26; C08K 3/36
(52) U.S. Cl. ........................ 428/405; 428/404; 524/425
(58) Field of Search ................. 428/404, 405; 524/425

(56) References Cited

U.S. PATENT DOCUMENTS

| | | | |
|---|---|---|---|
| 3,567,680 A | | 3/1971 | Iannicelli .................... 260/41.5 |
| 4,150,010 A | * | 4/1979 | Itoh et al. ..................... 524/506 |
| 4,477,606 A | | 10/1984 | Fukayama et al. ............ 523/200 |
| 5,908,660 A | | 6/1999 | Griffith et al. ................ 427/220 |
| 5,919,298 A | | 7/1999 | Griffith et al. ................ 106/490 |
| 5,977,249 A | * | 11/1999 | Kovar et al. .................. 524/723 |
| 6,121,347 A | * | 9/2000 | Yatsuyanagi et al. ......... 523/209 |
| 6,342,560 B1 | | 1/2002 | Okel .............................. 524/493 |
| 6,384,125 B1 | * | 5/2002 | Bergstrom et al. ............ 524/492 |
| 6,420,488 B1 | * | 7/2002 | Penot ........................ 525/332.7 |

FOREIGN PATENT DOCUMENTS

GB 2355453 A 4/2001 ............. C09C/3/12

OTHER PUBLICATIONS

Standard Test Methods for Vulcanized Rubber and Thermoplastic Elastomers–Tension, ANSI, Designation: D412–98a.
Standart Test Method for Rubber Property–Vulcanization Using Oscillating Disk Cure Meter, ANSI, Designation D 2084–01.
Standard Practice for Rubber–Materials, Equipment, & Procedures for Mixing Standard Compounds & Preparing Standard Vulcanized Sheets, ASTM, Designation: D3182–89.
Standard Test Methods for Rubber–Evauation of SBR (Styrene–Butadiene Rubber) Including Mixtures with Oil, ASTM, Designation: D3185–99.
Standard Practice for Rubber–Preparation, Testing, Acceptance, Documentation, and Use of Reference Materials, ASTM, Designation: D4678–94.

* cited by examiner

Primary Examiner—Margaret G. Moore
Assistant Examiner—Marc S Zimmer
(74) Attorney, Agent, or Firm—Jim L. DeCesare

(57) ABSTRACT

Treating compositions for application to particles of a filler consist of 5–95 percent by weight of a silicon atom containing hydrophobic-type treating agent, and 5–95 percent by weight of a silicon atom containing functional-type treating agent, based on the weight of the composition. Useful functional-type treating agents include bis (alkoxysilylalkyl)polysulfides and mercaptoorganosilicon compounds. Useful hydrophobic-type treating agents include polyorganohydrogensiloxanes and silanol terminated silicone oligomers. The filler most preferred is precipitated (i.e., synthetic) calcium carbonate.

4 Claims, No Drawings

METHOD OF TREATING PRECIPITATED CALCIUM CARBONATE FILLERS

FIELD OF THE INVENTION

This invention is directed to (i) treating compositions of a silicon atom containing hydrophobic-type treating agent and a silicon atom containing functional-type treating agent, (ii) filler particles treated with the composition, (iii) organic tire rubbers containing treated fillers, and (iv) methods of treating filler particles with a neat composition of the treating agents.

BACKGROUND OF THE INVENTION

While United Kingdom Patent Application GB 2 355 453 A, published on Apr. 25, 2001, describes a neat treatment method for making hydrophobic calcium carbonate fillers for use in rubbers, the organosilicon treating agents used in the UK publication are not the same as the organosilicon treating agents used herein. The UK publication does show a polymethylhydrogensiloxane as a component of the treating composition for providing hydrophobicity to filler particles, but the UK publication fails to show a functional-type organosilicon compound containing sulfur as the other component of the treating composition.

Similarly, while U.S. Pat. No. 6,342,560 (Jan. 29, 2002) describes some organosilicon treating agents similar to the organosilicon treating agents used herein, the method of making hydrophobic calcium carbonate fillers in the '560 patent is not via a neat treatment. Rather, the method of making hydrophobic calcium carbonate fillers in the '560 patent is carried out in an aqueous suspension, and the '560 patent fails to show a polymethylhydrogensiloxane as the component for providing hydrophobicity to the filler particles.

SUMMARY OF THE INVENTION

This invention relates to treating compositions suitable for applying to particles of a filler. The composition contains 5–95 percent by weight of a silicon atom containing hydrophobic-type treating agent, and 5–95 percent by weight of a silicon atom containing functional-type treating agent, based on the weight of the composition. In particular, the functional-type treating agent is a bis(alkoxysilylalkyl) polysulfide or a mercaptoorganosilicon compound, and the hydrophobic-type treating agent is a polyorganohydrogensiloxane or a silanol terminated silicone oligomer. The most preferred filler is precipitated (i.e., synthetic) calcium carbonate.

The invention also relates to fillers of particles treated with this treating composition, organic tire rubbers containing the treated fillers, and methods of treating particles of the filler with neat compositions of treating agents.

These and other features of the invention will become apparent from a consideration of the detailed description.

DETAILED DESCRIPTION OF THE INVENTION

This invention is directed to the treatment of surfaces of precipitated calcium carbonate fillers with a treating composition containing treating agents which consist of hydrophobic-type silicon atom containing treating agents, and functional-type silicon atom containing treating agents. These treating agents are applied to the surfaces of the filler by a neat process.

Because of the treatment, it was unexpectedly discovered that the properties of rubber containing the treated fillers were much improved. In this regard, the hydrophobic-type silanes and siloxanes are used to impart to the particles of the reinforcing filler hydrophobicity for compatibility with organic rubbers, while the functional-type silanes and siloxanes provide bonding or coupling to the rubber network during its curing operation.

The term neat as used herein, is intended to mean that fillers are rendered hydrophobic and functionalized by applying the treating composition consisting of the organosilicon compounds or mixtures of the organosilicon compounds in their undiluted form. Thus, the organosilicon compound(s) is not dissolved, dispersed, combined, or mixed with another substance or ingredient, such as water, solvents, or carriers, as a solution, dispersion, or emulsion. To this extent, the treating composition is applied in a substantially pure condition.

The term functional, as it applies to organosilicon compound(s), is intended to mean that the compound contains groups capable of reacting with the surfaces of the filler and the rubber.

In one particular embodiment of the invention, therefore, hydrophobized and functionalized fillers were prepared by applying a treating composition containing a treating agent consisting of a methylhydrogenpolysiloxane as the hydrophobic-type treating agent. The functional-type treating agent present in the treating composition was the compound 3-mercaptopropyltriethoxysilane (MPTES), i.e., $(C_2H_5O)_3SiCH_2CH_2CH_2SH$, or the compound bis[3-(triethoxysilyl)-propyl]tetrasulfide (TESPT), i.e., $(C_2H_5O)_3SiCH_2CH_2CH_2-S-S-S-S-CH_2CH_2CH_2Si(OC_2H5)_3$.

Characterization of properties of treated fillers was determined by Fourier Transform Infrared Spectroscopy (FTIR) and Brunauer-Emmett-Teller Nitrogen Adsorption (BET). These analytical techniques showed the hydrophobic and SH functional treatments present on surfaces of precipitated calcium carbonate fillers. When evaluated in organic tire rubber formulations, rubber samples containing treated precipitated calcium carbonate fillers showed a higher modulus and an increased 300/100 modulus ratio, which reflect an improvement in tire mechanical performance.

The Filler Substrate (Precipitated Calcium Carbonate)

While any type of precipitated calcium carbonate can be used, it is preferably a precipitated calcium carbonate with a high surface area. Particularly preferred materials are rhombohedral calcites with specific surface areas of 20 $m^2/g$. Such materials are generally available on a commercial basis from Solvay Interox, Houston, Tex., under Solvay's trademark SOCAL 31®.

The Functional-Type Treating Agent (Polysulfide)

This component of the treating composition comprises a bis(alkoxysilyl)polysulfide. Some general examples of bis (alkoxysilylalkyl)polysulfides which can be used include the bis(2-trialkoxysilylethyl)polysulfides in which the trialkoxy groups consist of trimethoxy, triethoxy, tri(methylethoxy), tripropoxy, tributoxy, or trioctyloxy, and in which the polysulfide is di-, tri-, tetra-, penta-, or an hexasulfide. Corresponding bis(3-trialkoxysilylpropyl)-, bis(3-trialkoxysilylisobutyl), -bis(4-trialkoxysilylbutyl)-, or bis(6-trialkoxysilylhexyl)polysulfide can also be used. Most preferred are the organosilanes including bis(3-trimethoxy-, -triethoxy-, and -tripropoxysilylpropyl)polysulfide; namely the di-, tri-, or tetrasulfide.

Specific examples of bis(alkoxysilylalkyl)polysulfides include compositions such as 3,3'-bis (trimethoxysilylpropyl)disulfide, 3,3'-bis(triethoxysilylpropyl)tetrasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(triethoxysilylpropyl)disulfide, 3,3'-bis(trimethoxysilylpropyl)hexasulfide, 3,3'-bis(trioctoxysilylpropyl)tetrasulfide, and their mixtures.

One most preferred compounds is 3,3'-bis(triethoxysilylpropyl) tetrasulfide (TESPT). TESPT is a commercial product marketed by Dow Corning Corporation, Midland, Mich. It is a mixture of 3,3'-bis(triethoxysilylpropyl)disulfide, 3,3'-bis(triethoxysilylpropyl)trisulfide, 3,3'-bis(triethoxysilylpropyl)tetrasulfide, and higher sulfide homologues having average sulfide contents of 3.5.

The Functional-Type Treating Agent (Mercaptoorganosilicon)

In another embodiment of the invention, the functional-type component of the treating composition may comprise a mercaptoorganosilicon compound instead of a bis(alkoxysilylalkyl)polysulfide.

Some representative examples of useful mercaptoorganosilicon compounds which can be employed herein are mercaptomethyltrimethoxysilane, mercaptoethyltrimethoxysilane, 3-mercaptopropyltrimethoxysilane, mercaptomethyltriethoxysilane, mercaptoethyltripropoxysilane, 3-mercaptopropyltriethoxysilane, (mercaptomethyl)dimethylethoxysilane, (mercaptomethyl)methyldiethoxysilane, 3-mercaptopropylmethyldimethoxysilane, and mixtures thereof. The most preferred of the compounds is 3-mercaptopropyltriethoxysilane (MPTES).

Some examples of useful blocked mercaptosilanes are 2-triethoxysilyl-1-ethyl thioacetate, 3-trimethoxy-silyl-1-propyl thiooctoate, bis-(3-triethoxysilyl-1-propyl)-methyldithiophosphonate, 3-triethoxysilyl-1-propyldimethylthiophosphinate, 3-triethoxysilyl-1-propylmethylthiosulfate, 3-triethoxysilyl-1-propyltoluenethiosulfonate, and their mixtures. By blocked is meant that the mercapto hydrogen atom is replaced by another group.

The Hydrophobic-Type Treating Agent (Polyorganohydrogensiloxane)

The hydrophobic-type component of the treating composition consists of a polyorganohydrogen siloxane of the formula:

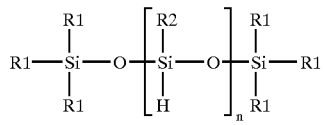

in which R1 and R2 represent alkyl groups containing 1–8 carbon atoms such as methyl, ethyl, isopropyl, and octyl; aryl groups such as phenyl, xenyl, naphthyl, and anthracyl; alkaryl (alkylaryl) groups such as tolyl and xylyl; aralkyl (arylalkyl) groups such as benzyl (phenylmethyl), phenylethyl (phenethyl), and 2-phenylpropyl; and cycloaliphatic groups containing 3–8 carbon atoms such as cyclobutyl and cyclopentyl. R1 can also be hydrogen. Typically, n has a value of 10–100, preferably 40–70. Such siloxanes generally have a viscosity of about 10 to about 1,000 mm²/s (centistoke).

The polyorganohydrogen siloxane used in the examples below was a trimethylsiloxy terminated polymethylhydrogensiloxane having a silicon bonded hydrogen content of 1.4–1.75 weight percent, and a viscosity of 20–40 mm²/s (centistoke). The composition is commercially available from the Dow Corning Corporation, Midland, Mich.

The Hydrophobic-Type Treating Agent (Silanol Terminated Silicone Oligomer)

In an alternate embodiment of the invention, the hydrophobic-type component of the treating composition may comprise a silanol terminated silicone oligomer, instead of the polyorganohydrogen siloxane above. The silanol terminated silicone oligomer has the formula:

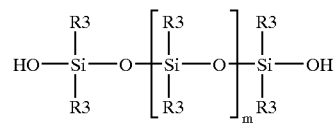

in which R3 is an alkyl group containing 1–8 carbon atoms such as methyl, ethyl, isopropyl, and octyl; an aryl group such as phenyl, xenyl, naphthyl, and anthracyl; an alkaryl (alkylaryl) group such as tolyl and xylyl; an aralkyl (arylalkyl) group such as benzyl (phenylmethyl), phenylethyl (phenethyl), and 2-phenylpropyl; or a cycloaliphatic group containing 3–8 carbon atoms such as cyclobutyl and cyclopentyl. Typically, m has a value in the range of 1–10. Such oligomeric siloxanes generally have a viscosity of about 20 to about 800 mm²/s (centistoke).

The silanol terminated silicone oligomer used in the examples was a hydroxyl endblocked polydimethylsiloxane fluid having a viscosity between 38–45 mm²/s (centistoke), in which m is about 6, and wherein the —OH content is between 3.9–4.3 weight percent.

This particular embodiment of the invention is unique to the extent that the silanol terminated silicone oligomer contains dimethyl units in the molecule which are capable of providing the hydrophobing characteristic needed, as well as —OH containing units capable of providing the functional characteristic needed, i.e., reactions (coupling) between the surface of the filler particles and the rubber surfaces in which the filler is employed, and/or with other coupling agents present in the treating composition.

Filler particles can be treated with the treating composition (i) by applying the hydrophobic-type treating agent and the functional-type treating agent to filler particles at the same time, (ii) by applying the hydrophobic-type treating agent and the functional-type treating agent to filler particles sequentially, (iii) or by first premixing the hydrophobic-type treating agent and the functional-type treating agent, and then applying the mixture to filler particles.

Application of the treating composition to the filler particles can be carried out at temperatures ranging from –20° C. to 200° C., preferably room temperature (20° C.–25° C.). The treated filler particles are then heated to temperatures of 100° C.–150° C. for one minute to 24 hours, to cause surfaces of the filler particles to react with the treating composition.

The treating composition is applied to the filler particles in the amount of 1–15 percent by weight, based on the weight of filler particles being treated. The treating composition contains 5–95 percent by weight of the hydrophobic-type treating agent, and 5–95 percent by weight of the functional-type treating agent, based on the total weight of the treating composition.

EXAMPLES

The following examples are set forth in order to illustrate the invention in more detail. Unless otherwise noted, the testing, vulcanization, preparation of sheets, and evaluations, were carried out generally in accordance with the protocols prescribed by the American Society for Testing and Materials (ASTM) standards, including ASTM D 412-98a, "Standard Test Methods for Vulcanized Rubber & Thermoplastic Elastomers"; ASTM D 2084-01, "Standard Test Method for Rubber Property—Vulcanization Using Oscillating Disk Cure Meter; ASTM D 3182–89, "Standard Practice for Rubber—Materials, Equipment, and Procedures for Mixing Standard Compounds and Preparing Standard Vulcanized Sheets"; ASTM D 3185-99, "Standard Test Methods for Rubber—Evaluation of SBR (Styrene-Butadiene Rubber) Including Mixtures With Oil"; and ASTM D 4678-94, "Standard Practice for Rubber—Preparation, Testing, Acceptance, Documentation, and Use of Reference Materials".

Example 1

General Treatment Procedure

Specific amounts of one of the treating agents were added drop wise to dry precipitated calcium carbonate accompanied by vigorous stirring. After allowing the mixture to blend for 10–15 minutes, the other treating agent was added drop wise, and mixing was continued for an additional period of 60 minutes. After mixing, the blend was placed into an oven at 150° C. overnight to ensure complete reaction. The fillers were then evaluated in organic rubber formulations.

Example 2

Compounding

Table 1 below indicates compositions used in carrying out a first phase of the compounding procedure.

TABLE 1

Compositions Used for Compounding

| Composition | Chemical Description | Manufacturer |
|---|---|---|
| Solfex 1216 | Styrene-butadiene copolymer (polymer) | Goodyear Tire |
| Budene 1207 | Polybutadiene (polymer) | Goodyear Tire |
| Kadox-920C | ZnO (activator/accelerator/reinforcement/dispersion) | Zinc Corporation |
| Sundex 8125 | Petroleum Hydrocarbon Oil (Plasticizer) | R. E. Carroll Inc. |
| Wingstay 100 | Mixed diaryl-p-phenylenediamines (antioxidant) | Goodyear Tire |
| Industrene ® | Stearic Acid (accelerator, activator) | R. E. Carroll Inc. |
| Santoflex 6 (PPD) | N-(1,3-Dimethylbutyl)-N'-phenyl-p-phenylenediamine | Harwick Standard |
| Sunolite 240 | Petroleum Wax Blend (atmsp. protection) | Astor Wax Corp. |
| RM Sulfur | Ground Sulfur (curing agent) | R. E. Carroll Inc. |
| Santocure(TBBS) | N-tert-Butyl-2-benzothiazole-sulfenamide (accelerator) | Harwick Standard |
| Perkacit (DPG) | N,N'-Diphenylguanidine (accelerator) | Harwick Standard |

Compounding was carried out and completed using a Haake mixer equipped with Banbury blades. The equipment was operated at 115 rpm using a set point of 80° C. The compositions shown in Table 1 were employed in the amounts shown below.

| Composition | Weight (gram) |
|---|---|
| Load A | |
| Solfex 1216 | 17.5 |
| BR 1207 | 7.5 |
| Load B | |
| Treated CaCO$_3$ | 9.75 |
| Sundex 8125 | 7.5 |
| Zinc Oxide | 0.63 |

-continued

| Composition | Weight (gram) |
|---|---|
| Wingstay 100 | 0.5 |
| Stearic Acid | 0.25 |
| Load C | |
| Treated CaCO$_3$ | 9.75 |

The mixer was charged with the compositions of Load A, and mixed for about one minute or until the temperature returned to 80° C. The mixer was stopped and the compositions of Load B were added. The ram was lowered carefully and mixing commenced for about two minutes. Load C was added while the blades were in motion, and mixed for additional 4.5 minutes. Care was taken in loading the calcium carbonate (Load C) to avoid the calcium carbonate from being drawn up the vent stack. When this occurred, additional amounts of calcium carbonate were added to compensate for any loss. The mixer rpm was increased to 155 rpm, creating a high shear that resulted in increasing the temperature to between 140–150° C. This forced any water out from the system. This master batch was allowed to stand for one hour prior to carrying out the next phase, in which the equipment was operated at 50 rpm using a set point of 50° C. The compositions used in this phase of the procedure are shown below.

| Composition | Weight (gram) |
|---|---|
| Master batch | 50 |
| Santoflex 6 PPD | 0.5 |
| Sunolite 240 | 0.38 |
| RM Sulfur | 0.35 |
| TBBS | 0.43 |
| DPG | 0.50 |

The set point used for temperature was 50° C. without any cooling. The temperature was not allowed to exceed 120° C., to avoid scorching by the sulfur cure. The final temperature was in the range of about 73–80° C. All of the compositions used were pre-weighed, and were added as rapidly as possible over a 30 second mixing period that ended after the elapse of 4 minutes.

Example 3

Milling

The compounded master batch was removed from the Haake mixer and flattened out using a two Roll Mill to a 0.075 mil thickness. The compounded composition was passed through the mill five times to force out air bubbles and to achieve the desired film thickness. The milling-speed was set at 3 rpm, which prevented heat build-up from the shear.

Example 4

Vulcanization

Vulcanization kinetics were recorded on a Model R100S Monsanto Cure Rheometer, at 150° C., using an MPC System with an ADO93 Die and an ARC at 1° oscillation. The Cure Rheometer provided T-90 cure values, i.e., 90% cure, in minutes. The T-90 was then increased to 10 minutes to provide a cure time sufficient to build up the tire rubber slab for testing. From the cure profile, a scorch time in minutes could also be detected. For curing, a 4"×4" chase system was used. The milled tire compound was placed in the center of the chase system and cold pressed for 5 minutes at a pressure of 12 metric tons. The vulcanization was carried out in an electrically heated press at 150° C. in which air had been removed. The composition was then cured for the calculated T-90 cure+10 minutes time at 20 metric tons.

Example 5
Measurement of Physical Properties

The hardness of the elastomer samples were measured on a Shore A scale with a Model CV-71200 Conveloader Type A Shore Instrument Durometer. The measurements were made using three layers in height of plied rubber pieces. An average of three readings at three different points was used as the value for the hardness.

The tensile, elongation, and modulus were determined using stress-strain curves obtained with an Instron 5500R Model 1122 device equipped with a 5000 N load cell, an extensometer, and a Merlin Software program with a full scale of 254 mm, a gauge length of 20 mm, and a speed of 19.69 in/min. Dog-bone shaped samples with a width of 0.157 inch were pulled to rupture at a speed of 19.69 in/min. The data for the tensile strength, elongation, and modulus are shown in Table 2, and the values represent an average of five tests.

In Table 2, it should be noted that higher values of the 300/100 Modulus Ratio in the last column in Table 2 indicate best tire performance.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of treating particles of a calcium carbonate filler comprising applying to particles of the filler a composition comprising (i) functional-type treating agents selected from the group consisting of bis(alkoxysilylalkyl)polysulfides and mercaptoorganosilicon compounds, and (ii) a hydrophobic-type treating agent comprising a polyorganohydrogensiloxane having the formula:

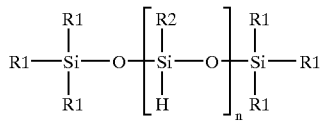

in which R1 and R2 represent alkyl groups containing 1–8 carbon atoms, aryl groups, alkaryl groups, aralkyl groups, or cycloaliphatic groups containing 3–8 carbon atoms, and n has a value of 10–100.

2. A filler comprising particles treated with (i) functional-type treating agents selected from the group consisting of

TABLE 2

Summary of Mechanical Properties of Treated CaCO₃ Reinforced Rubbers

| Treating Composition | Scorch min | $T_{90}$ min | Durometer | Tensile MPa | Elong. % | 100% Mod MPa | 300% Mod MPa | 300/100 Mod Ratio |
|---|---|---|---|---|---|---|---|---|
| A. Untreated CaCO₃ | 4.0 | 9.0 | 45 | 4.47 | 574 | 0.77 | 1.47 | 1.91 |
| A'. Untreated CaCO₃ | 3.5 | 8.2 | 45 | 4.08 | 526 | 1.09 | 1.92 | 1.76 |
| B. 0.3% TESPT + 3% SiH Siloxane | 5.0 | 20.4 | 47 | 5.35 | 499 | 1.08 | 3.09 | 2.86 |
| B'. 6.4% TESPT + 3.1% SiH Siloxane | 2.6 | 15.5 | 47 | 6.91 | 514 | 1.26 | 4.01 | 3.18 |
| C. 0.3% MPTES + 3% SiH Siloxane | 5.1 | 20.7 | 44 | 5.44 | 565 | 0.88 | 2.62 | 2.98 |
| D. 0.6% MPTES + 3.4% SiH Siloxane | 3.8 | 15.3 | 47 | 4.27 | 443 | 1.30 | 4.09 | 3.15 |
| E. 1.3% MPTES + 3.3% SiH Siloxane | 3.9 | 19.2 | 45 | 5.58 | 464 | 1.12 | 3.57 | 3.19 |
| F. 1.4% MPTES | 4.5 | 8.0 | 48 | 5.49 | 588 | 1.30 | 3.58 | 2.75 |
| G. 6% MPTES + 3.1 SiH Siloxane | 3.2 | 13.3 | 48 | 6.41 | 480 | 1.39 | 5.26 | 3.78 |
| G'. 8.95% MPTES + 3.2 SiH Siloxane | 3.1 | 12.2 | 43 | 6.42 | 491 | 1.19 | 3.92 | 3.29 |
| H. 3.1 SiH Siloxane | 4.0 | 16.3 | 46 | 3.80 | 641 | 0.82 | 1.81 | 2.21 |
| H'. 3.0% Silanol Fluid | 3.8 | 12.6 | 43 | 3.29 | 463 | 0.92 | 1.80 | 1.96 |
| J. 1% MPTES + 3% Silanol Fluid | 4.6 | 12.1 | 47 | 5.13 | 523 | 1.05 | 2.52 | 2.40 |
| K. 2% MPTES + 3% Silanol Fluid | 4.2 | 10.5 | 47 | 4.25 | 415 | 1.16 | 3.20 | 2.76 |

Table 2 shows that compositions B', D, E, G, and G' which are treating compositions according to the present invention, achieved 300/100 Modulus Ratios exceeding three, indicating the best overall tire performance.

While this invention has been illustrated in respect to the use of treated filler particles in organic tire rubber, it should be understood that these treated filler particles could be used in other applications including wire and cable jacketing, hoses, gaskets and seals, industrial and automotive drive belts, engine mounts, V-belts, conveyor belts, roller coatings, shoe sole materials, packing rings, and damping elements.

bis(alkoxysilylalkyl)polysulfides and mercaptoorganosilicon compounds, and (ii) a hydrophobic-type treating agent comprising a polyorganohydrogensiloxane having the formula:

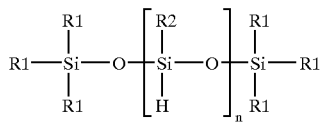

in which R1 and R2 represent alkyl groups containing 1–8 carbon atoms, aryl groups, alkaryl groups, aralkyl groups, or cycloaliphatic groups containing 3–8 carbon atoms, and n has a value of 10–100.

3. An organic tire rubber comprising rubber containing filler particles treated with (i) a functional-type treating agent selected from the group consisting of bis(alkoxysilylalkyl)polysulfides and mercaptoorganosilicon compounds, and (ii) a hydrophobic-type treating agent comprising a polyorganohydrogensiloxane having the formula:

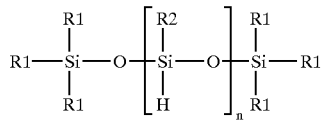

in which R1 and R2 represent alkyl groups containing 1–8 carbon atoms, aryl groups, alkaryl groups, aralkyl groups, or cycloaliphatic groups containing 3–8 carbon atoms, and n has a value of 10–100.

4. A method of treating particles of a filler comprising applying to particles of the filler a composition comprising functional-type treating agents selected from the group consisting of bis(alkoxysilylalkyl)polysulfides and mercaptoorganosilicon compounds, and (ii) a hydrophobic-type treating agent comprising a polyorganohydrogensiloxane having the formula:

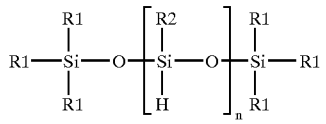

in which R1 and R2 represent alkyl groups containing 1–8 carbon atoms, aryl groups, alkaryl groups, aralkyl groups, or cycloaliphatic groups containing 3–8 carbon atoms, and n has a value of 10–100.

* * * * *